(12) United States Patent
Feng

(10) Patent No.: US 11,637,911 B1
(45) Date of Patent: Apr. 25, 2023

(54) LOCATION AND BEHAVIOR BASED PREFETCH AND CACHING OF REMOTE DATA

(71) Applicant: Meta Platforms, Inc., Menlo Park, CA (US)

(72) Inventor: Louis Feng, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/883,837

(22) Filed: May 26, 2020

(51) Int. Cl.
*H04L 67/5681* (2022.01)
*G06F 16/9535* (2019.01)
*H04W 4/029* (2018.01)

(52) U.S. Cl.
CPC ...... *H04L 67/5681* (2022.05); *G06F 16/9535* (2019.01); *H04W 4/029* (2018.02)

(58) Field of Classification Search
CPC . H04L 67/2847; H04W 4/029; G06F 16/9535
See application file for complete search history.

(56) References Cited

U.S. PATENT DOCUMENTS

| | | | | |
|---|---|---|---|---|
| 2013/0018714 A1* | 1/2013 | George | ............... | G06Q 30/0277 705/14.16 |
| 2014/0086046 A1* | 3/2014 | Reeves | ............... | H04L 67/2842 370/229 |
| 2014/0315564 A1* | 10/2014 | Conway | ................ | H04W 4/029 455/452.1 |
| 2015/0011242 A1* | 1/2015 | Nagaraj | ............... | H04W 84/005 455/456.2 |
| 2015/0168150 A1* | 6/2015 | Kahn | .................... | G06F 16/955 701/538 |
| 2016/0044127 A1* | 2/2016 | Filner | ..................... | H04L 67/22 709/213 |
| 2018/0007161 A1* | 1/2018 | Hwang | .................... | H04L 67/12 |
| 2018/0097905 A1* | 4/2018 | Todasco | .................. | H04L 67/02 |
| 2018/0293595 A1* | 10/2018 | McMaster | ............... | H04W 4/40 |
| 2019/0026852 A1* | 1/2019 | Senarath | ................ | G06Q 90/00 |
| 2019/0258967 A1* | 8/2019 | Gonzalez | ............... | G06Q 50/14 |
| 2020/0169594 A1* | 5/2020 | Stumbo | ................... | H04L 65/61 |

FOREIGN PATENT DOCUMENTS

WO 2012176924 12/2012

OTHER PUBLICATIONS

European Search Report for European Application No. 21170841.7, dated Oct. 4, 2021, 2 pages.
Office Action dated Mar. 2, 2023 for European Application No. 21170841.7, filed Apr. 28, 2021, 6 pages.

* cited by examiner

*Primary Examiner* — Rafael Pérez-Gutiérrez
*Assistant Examiner* — Frank E Donado
(74) *Attorney, Agent, or Firm* — Van Pelt, Yi & James LLP

(57) ABSTRACT

A method for prefetching and caching data onto a device is disclosed. An association of a user with a travel to a destination location is determined. Data network availability in at least a portion of a likely future travel path from a current location of the user to the destination location is analyzed. Based on the analysis of the data network availability, a segment of the likely future travel path where data network is likely unreliable is identified. Data likely desired by the user when the user travels in the identified segment is predicted. A device of the user is caused to obtain and cache the predicted data.

19 Claims, 5 Drawing Sheets

LOCATION AND BEHAVIOR BASED PREFETCH AND CACHING OF REMOTE DATA

BACKGROUND OF THE INVENTION

Many applications and services run on a client-server architecture in which a client accesses a remote server for information. For example, a mobile application runs on a mobile device, such as a phone or a tablet. Typically, mobile applications require Internet access in order to behave properly and deliver the expected user experiences. However, network connections may not be always reliable. In some locations, especially remote locations, network connections are not available, which renders some applications and services unusable. For example, applications or services that provide maps or emergency contact information may become unavailable when they are most needed.

BRIEF DESCRIPTION OF THE DRAWINGS

Various embodiments of the invention are disclosed in the following detailed description and the accompanying drawings.

DETAILED DESCRIPTION

Figure 1:
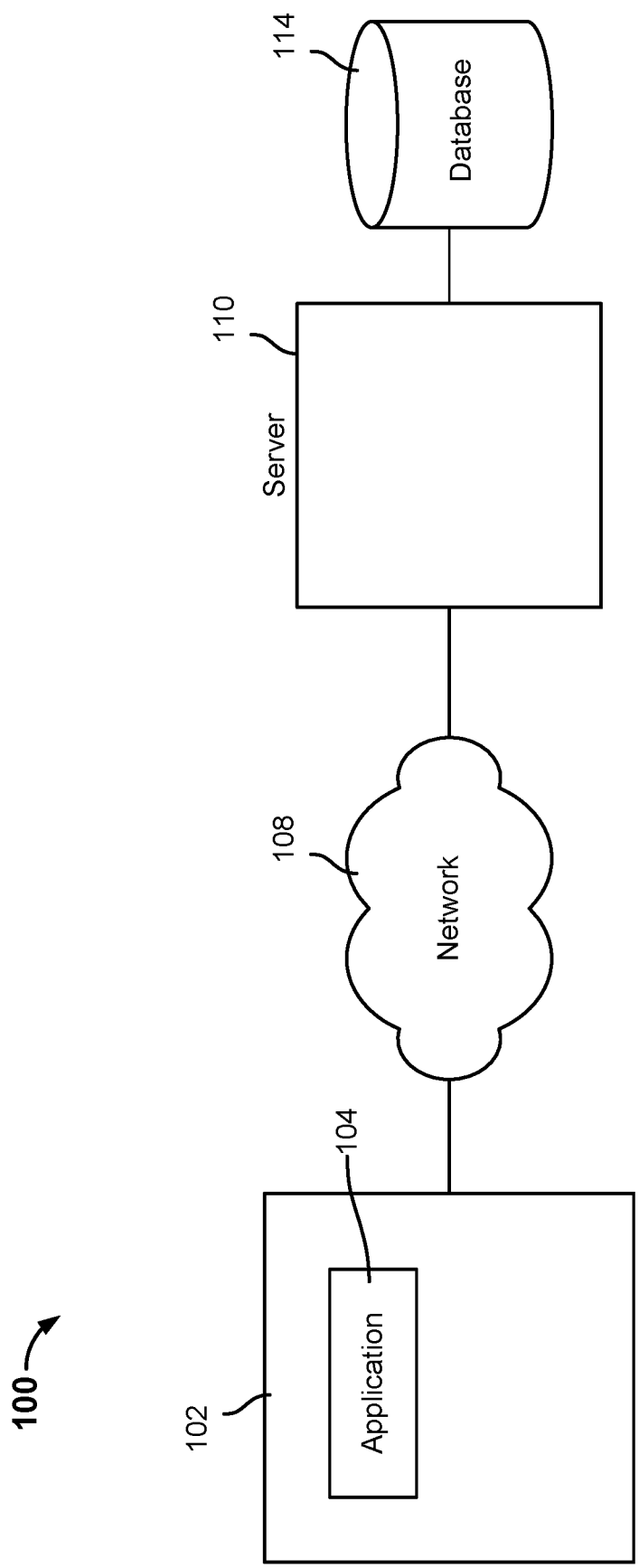
FIG. 1 illustrates an embodiment of a system 100 for prefetching and caching data onto a user device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some applications and services cannot run properly when a user travels from one geographical location to another. For example, a map application may fail to run during portions of a user's trip when the user travels from location A to location B. As the user travels to location B, the user may pass through areas that have no network coverage or poor network and Internet connections, thereby rendering the map application useless when the user arrives in those areas. The areas that do not have reliable network connections may include location B, the surrounding areas of location B, or any areas along the route from location A to location B.

In one example, a user may travel from the San Francisco Bay Area to Lake Tahoe for a ski vacation. As the user drives from his home to a ski resort, the user's car passes by major cities, small towns, or remote areas through highways, local roads, and country roads. The user's mobile device has excellent network connectivity at major cities, but poor or no connectivity at small towns or remote areas. As a result, when the user travels to those areas with poor network conditions, the user's mobile device cannot connect to the Internet and therefore cannot access local information, including local maps, local news or popular content, directions to hotels, restaurants, police stations, and the like.

One solution used today is to allow a user to manually download map data or other data and cache the data in the user's portable device before the trip. However, this requires the user to have prior knowledge that location B does not have a good Internet connection. Often when a user finds out that location B does not have a good Internet connection, the user is already in a position where the user can no longer access the data he needs. Even if the user has prior knowledge that location B has poor network conditions before the trip, or even if location B does not have an Internet connection problem, there is no way for the user to know whether there will be good Internet connectivity at any point during the trip between location A and location B.

In the present application, a need to prefetch and cache data to a portable device is predicted, and the scheduling of the prefetching of data and the amount and type of data to prefetch are determined. The benefit of the technique is that it enables uninterrupted services to a user without an Internet connection.

Different types of information may be collected. One type of information is network coverage and conditions. Another type of information includes user behaviors. The network information may be used to determine what services might become available or unavailable as a user transits from one region to another. The user behavior data may be used to determine when the user will need to access remote data (e.g., maps, contacts, lodging, gas stations, photos, etc.). Based on this information, relevant data may be automatically prefetched and cached on the user device at different times to allow the user to continue to use the applications and services even without any Internet connectivity.

An association between a trip to a destination location and a user is determined. Data network availability in at least a portion of a likely future travel path from a current location of the user to the destination location is analyzed. A segment of the likely future travel path where data network is likely unreliable is identified based on the analysis of the data network availability. Data likely desired by the user when the user travels in the identified segment is predicted, and a device of the user is caused to obtain and cache the predicted data.

FIG. 1 illustrates an embodiment of a system 100 for prefetching and caching data onto a user device. System 100 includes device 102, network 108, server 110, and database 114. Examples of device 102 include laptop computers, desktop computers, tablet computers, smartphones, and other mobile devices. Application 104 is running on device 102. Application 104 may be a mobile application.

Device 102 is connected to server 110 through network 108. Network 108 may be any combination of public or private networks, including intranets, local area networks (LANs), wide area networks (WANs), radio access networks (RANs), Wi-Fi networks, the Internet, and the like. Server 110 is connected to database 114. In some embodiments, database 114 may be located on one or more hosts that are external to server 110. In some embodiments, database 114 stores network coverage and condition information and user behaviors.

Figure 2:
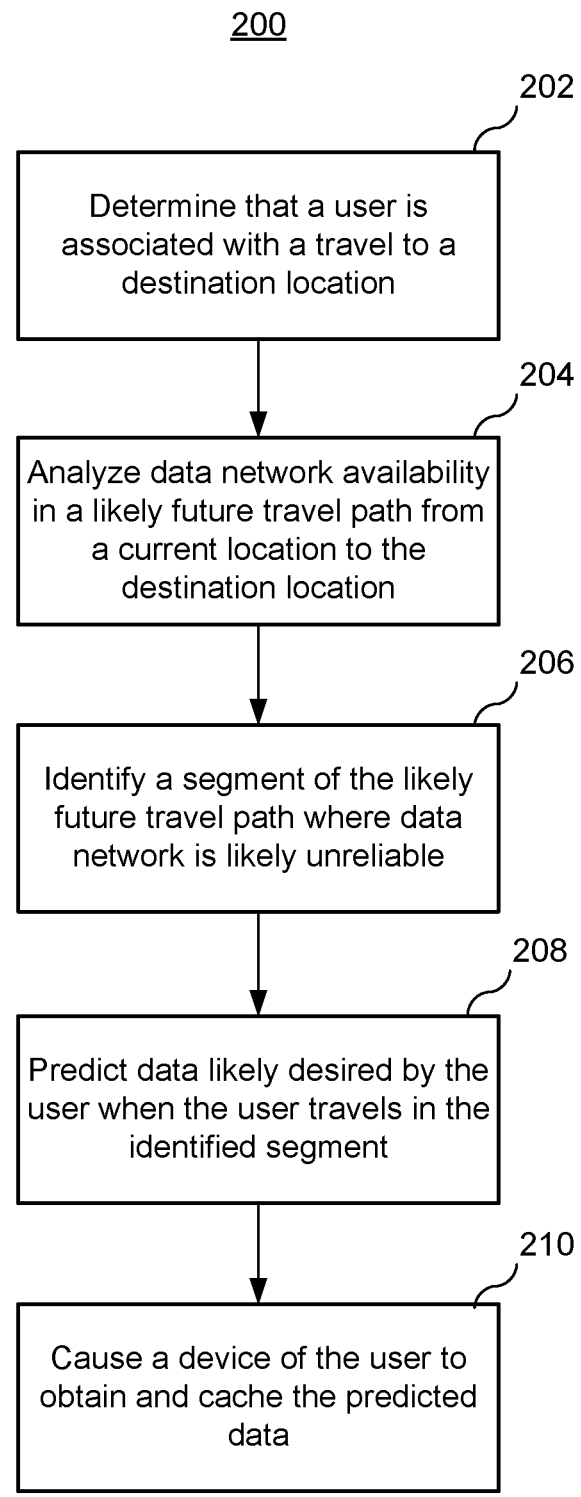
FIG. 2 illustrates an embodiment of a process 200 for prefetching and caching of remote data based on location and user behavior information.

FIG. 2 illustrates an embodiment of a process 200 for prefetching and caching remote data based on location and user behavior information. In some embodiments, process 200 may be performed by system 100 as shown in FIG. 1.

At step 202, it is determined that a user is associated with a travel to a destination location. In some embodiments, it is predicted that a user is likely to travel to a destination location. The prediction may be based on the user's online activities and behaviors.

Figure 3:
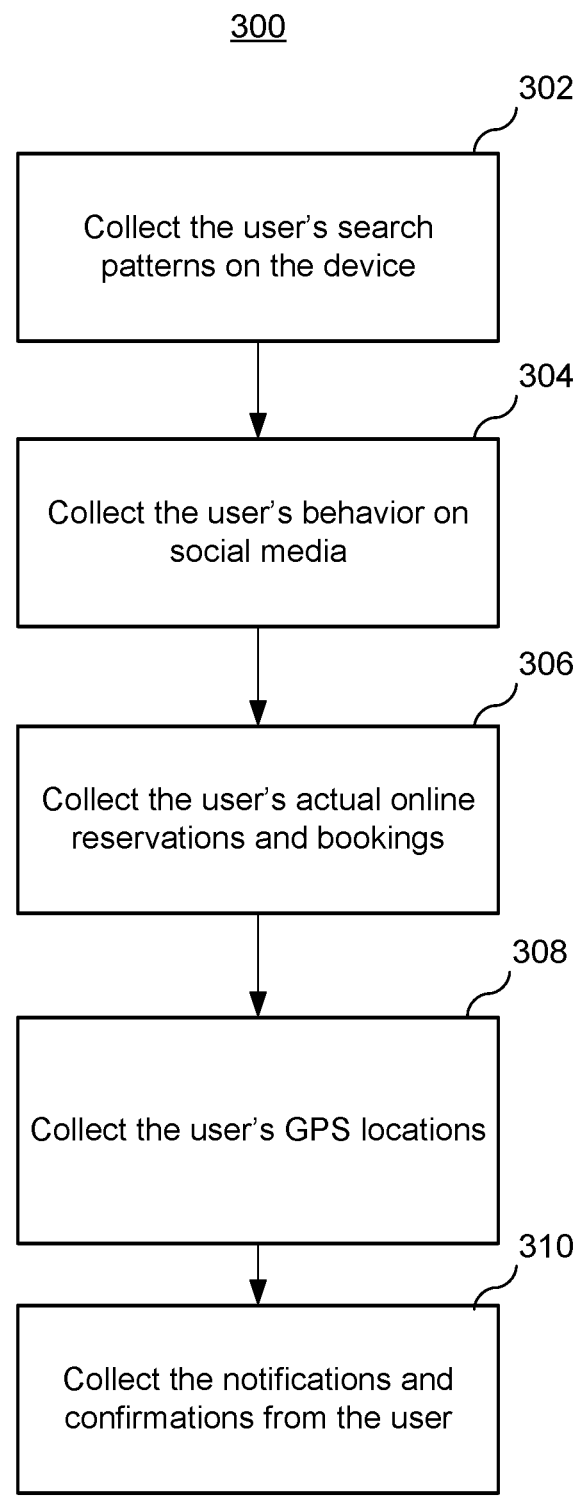
FIG. 3 illustrates an embodiment of a process 300 for predicting that a user is likely to travel to a destination location based on the user's online activities and behaviors.

FIG. 3 illustrates an embodiment of a process 300 for predicting that a user is likely to travel to a destination location based on the user's online activities and behaviors. In some embodiments, process 300 may be performed by step 202 of process 200 as shown in FIG. 2.

With reference to FIG. 3, at step 302, the user's search patterns may be collected, and the prediction may be based on the user's search patterns. For example, the user may search for contents that indicate that the user is likely planning a trip to a destination location, such as hotels, transportation such as flights and car rentals, restaurants, tourist attractions, and the like. For example, the user may search for hotels and restaurants in New York City, flights to and from New York City, and tourist attractions, such as the Statute of Liberty, Central Park, Metropolitan Museum of Art, and Rockefeller Center.

At step 304, the user's behavior on social media may be collected, and the prediction may be based on the user's behavior on social media. For example, the user may mention his upcoming trip to New York City in his chat messages and social media posts. The user may post his flight arrival information on social media. The user may chat about his plans and itineraries in New York City.

At step 306, the user's actual online reservations and bookings may be collected, and the prediction may be based on the user's actual online reservations and bookings, including flights, hotels, car rentals, restaurants, tourist attractions, performances, and the like.

In some embodiments, the prediction may be based on the user's regular routines. At step 308, the user's GPS (global positioning system) locations may be collected. Based on the user's GPS (global positioning system) locations, the user may be determined as traveling between his home and his workplace regularly on Monday to Friday at particular times of the day. The user may be determined as going to the park, fitness center, grocery stores, etc., as part of his regular routine.

At step 310, notifications or confirmations provided by the user may be collected. The system then determines that a user is associated with a travel to a destination location based on the user's notifications or confirmations. In some embodiments, the mobile application may provide the user ways to notify the application that he is planning a trip to a certain destination location. For example, the user may indicate his destinations, transit stops, and itineraries. When the user notifies the application, the user may further be asked whether he would permit the application to prefetch and cache relevant trip data onto his device prior to the trip. The relevant trip data may include different types of data. The user may select which types of data are preferred to be prefetched and cached onto his device prior to the trip. One type of prefetched data comprises information related to the trip, such as maps, routes, hotel information, airport information, car rental locations, restaurants, tourist attractions, special events, gas stations, and the like. Another type of prefetched data comprises contents on social media that may otherwise become inaccessible due to loss of network connectivity during any portions of the trip. For example, social media content may include news feed, friends, wall, timeline, likes and reaction, comments, messages and inbox, notifications, groups, etc. Another type of prefetched data comprises general information, such as national or local news. Another type of prefetched data comprises emergency information, such as police stations, hospitals, medical clinics, and the like.

With continued reference to FIG. 2, at step 204, data network availability in at least a portion of a likely future travel path from a current location of the user to the destination location is analyzed.

Figure 4:
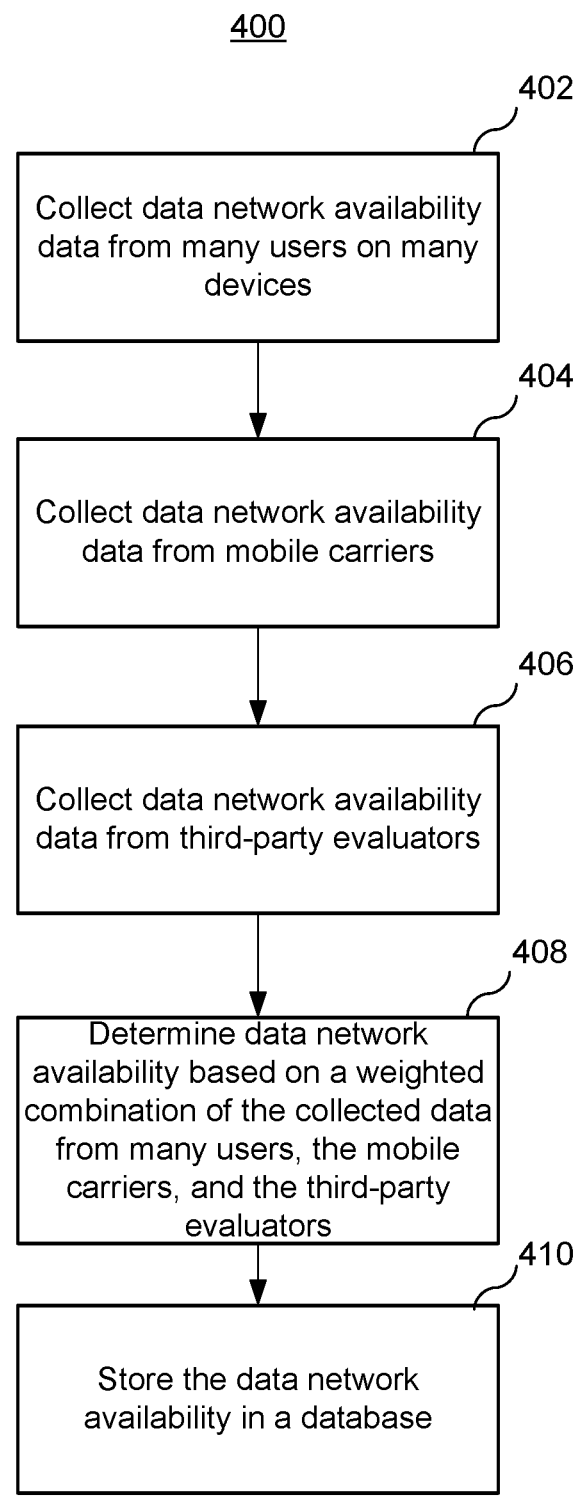
FIG. 4 illustrates an embodiment of a process 400 for determining the data network availability at different regions.

Data network availability at different regions may be determined and stored in a database, e.g., database 114 in FIG. 1. FIG. 4 illustrates an embodiment of a process 400 for determining the data network availability at different regions. In some embodiments, process 400 may be performed by step 204 of process 200 as shown in FIG. 2.

With reference to FIG. 4, at step 402, data network availability at different regions maybe determined by collecting information from many users on many devices. For example, the information may be collected when a user is connected to server 110 via his/her device for different online activities, including accessing social media, maps, or other applications. Different metrics that indicate data network availability, coverage, or quality may be collected, including network signal strength, download speed, upload speed, network latency, reliability, data performance, call performance, text performance, overall performance, and the like. Each of the collected metrics may be associated with a set of attributes, including location, time, type of wireless networking technology, and the like. The location associated with the metric may be specified by a set of coordinates, e.g., a set of GPS coordinates expressed as the combination of latitude and longitude. The time associated with the metric may include the day of the week, the time of the day, the month, etc. The type of wireless networking technology may be cellular wide area networks (WANs) or Wi-Fi local area networks (LANs).

In some embodiments, metrics that indicate data network availability may continuously be collected, accumulated, or updated. In some embodiments, metrics that indicate data network availability may be periodically collected, accumulated, or updated.

With reference to FIG. 4, at step 404, data network availability at different regions maybe determined based in part on different mobile carriers' self-reported data. At step 406, data network availability at different regions maybe determined based in part on different third-party evaluators' data. In some embodiments, data network availability in different regions maybe determined by combining different information, such as the collected information from many users on many devices, mobile carriers' self-reported data, or third-party evaluators' data. For example, as shown in step 408, data network availability at different regions maybe a weighted sum of the collected information from many users on many devices, the mobile carriers' self-reported data, and the third-party evaluators' data. At step 410, data network availability at different regions is stored in a database.

Based on the collected data network availability data corresponding to different regions, data network availability at a portion of a likely future travel path from a current location of the user to the destination location may be analyzed.

In some embodiments, the likely future travel path may be predicted based on the user's online activities and behaviors, as described above. In some embodiments, the prediction may be based on the user's search patterns. In some embodiments, the prediction may be based on the user's behaviors on social media. In some embodiments, the prediction may be based on the user's actual online reservations and bookings, including flights, hotels, car rentals, restaurants, tourist attractions, performances, and the like. In some embodiments, the prediction may be based on the user's regular routines. In some embodiments, the prediction may be based on the user's notifications or confirmations.

For example, a likely future travel path for a user that has been determined as planning to travel from the San Francisco Bay Area to Lake Tahoe may be predicted as passing through San Mateo, San Francisco, Vacaville, Sacramento, Folsom, and other smaller cities via US-101, I-80, US-50, and other local roads. Another likely future travel path for the user may be predicted as passing through San Mateo, Hayward, Castro Valley, Dublin, Stockton, Sacramento, Folsom, and other smaller cities via I-80, US-50, and other local roads. The collected data network availability corresponding to the above locations may be analyzed.

In another example, a likely future travel path for a user that has been determined as planning to travel from the San Francisco Bay Area to New York City maybe predicted as passing through Millbrae, San Francisco International Airport, Newark Liberty International Airport, Manhattan, and other smaller cities via a combination of air and car travel. The collected data network availability corresponding to the above locations may be analyzed.

In some embodiments, the likely future travel path may be updated as the user travels towards the destination location. For example, the travel path may change due to traffic congestion and road construction, and therefore the likely future travel path may be updated accordingly. The collected data network availability corresponding to the updated travel path may be analyzed.

With continued reference to FIG. 2, at step 206, any segments of the likely future travel path where data network is likely unreliable maybe identified based on the analysis of the data network availability, wherein the data network availability may be based on a plurality of metrics. In some embodiments, the determination of whether a segment of the likely future travel path where data network is likely unreliable may be based on one or more predetermined thresholds, each corresponding to a different metric. Different metrics that indicate data network availability, coverage, or quality include network signal strength, download speed, upload speed, network latency, reliability, data performance, call performance, text performance, overall performance, and the like. A data network availability metric may need to satisfy a minimum or maximum threshold. If a segment of the likely future travel path has a data network availability metric that is below a predetermined minimum threshold, then the data network of the segment is determined as likely unreliable. For example, if a signal strength corresponding to a location is below a minimum threshold of x dBm, then the data network of the segment is determined as likely unreliable. Similarly, if a segment of the likely future travel path has a data network availability metric that is above a predetermined maximum threshold, then data network of the segment is determined as likely unreliable. For example, if a network latency corresponding to a location is above a maximum threshold of x milliseconds, then the data network of the segment is determined as unreliable.

In some embodiments, a time or a time window of when the user is predicted to reach or stay at a segment of the likely future travel path is predicted, and a data network availability metric corresponding to the time or time window is compared with the predetermined threshold in order to determine whether the data network is likely unreliable. For example, if a user is predicted to reach a small town during hours when the Internet experiences congestion, then the data network availability metric may not satisfy the predetermined threshold and therefore the data network is predicted as likely unreliable. Conversely, if a user is predicted to reach the small town outside of the times when the Internet is busy, then the data network availability metric may satisfy the predetermined threshold and therefore the data network may be predicted as likely reliable.

With continued reference to FIG. 2, at step 208, data that is likely desired by the user when the user travels in the identified segment is predicted. Data that is likely desired by the user when the user travels in the identified segment may include different types of data. One type of data comprises information related to the trip, such as maps, routes, hotel information, airport information, car rental locations, restaurants, tourist attractions, special events, gas stations, and the like. Another type of data comprises contents on social media that may otherwise become inaccessible due to loss of network connections during any portions of the trip. For example, social media content may include news feed, friends, wall, timeline, likes and reaction, comments, messages and inbox, notifications, groups, etc. Another type of data comprises general information, such as national or local news. Another type of data comprises emergency information, such as police stations, hospitals, medical clinics, and the like.

In some embodiments, data that is likely desired by the user when the user travels in the identified segment is predicted. In some embodiments, the data may be location specific; for example, the data may be related to facilities, services, emergency information, or attractions located at the identified segment of the likely future travel path. The prediction may be based on the user's online activities and behaviors.

In some embodiments, the prediction may be based on the user's search patterns. For example, the user may search for contents that indicate that the user is likely planning to stop over at or pass by a certain location, such as restaurants, rest areas, hotels, and tourist attractions. For example, the user that has been determined as planning to travel from the San Francisco Bay Area to Lake Tahoe might have searched previously for restaurants or coffee shops in a small town which is within the identified segment of the likely future travel path to Tahoe, and accordingly data related to the locations may be predicted as likely desired data for the user.

In some embodiments, the prediction may be based on the user's actual online reservations and bookings, including hotels, restaurants, tourist attractions, and performances that are located within the identified segment of the likely future travel path. Accordingly, facilities, services, or attractions located at the identified segment of the likely future travel path may be predicted as likely desired data for the user.

In some embodiments, the prediction may be based on the user's behavior on social media. For example, the user may mention his plan to stop over or stay in a city as part of his trip in his chat messages and social media posts. Accordingly, facilities, services, or attractions located at the identified segment of the likely future travel path may be predicted as likely desired data for the user.

In some embodiments, the prediction may be based on the user's regular routines. For example, based on the user's GPS (global positioning system) locations, the user may be determined as traveling between his home and his workplace regularly on Monday to Friday at particular times of the day. The user may be determined as going to the park, fitness center, grocery stores, etc., as part of his regular routine. If the user typically stops at or passes by the identified segment during his routine travel, then facilities and services located at the identified segment of the likely future travel path may be predicted as likely desired data for the user.

In some embodiments, some predicted data that is likely desired by the user when the user travels in the identified segment is not location specific. For example, some predicted data comprises contents on social media that may otherwise become inaccessible due to loss of network connectivity during any portions of the trip. For example, social media content may include news feed, friends, wall, timeline, likes and reaction, comments, messages and inbox, notifications, groups, etc. Another type of predicted data comprises general information, such as national or local news. Whether any of these types of data is likely desired by the user may be predicted based on the user's online activities and behavior. For example, if the user has routinely accessed social media contents or news during his past trips, then these types of data may be predicted as likely desired by the user.

In some embodiments, data that is likely desired by the user when the user travels in the identified segment is selected by the user. For example, the user may indicate in his profile his preferences for prefetching or caching certain types of data. The user's preferences may apply to all trips or a single trip (i.e., trip-specific).

The advantage of predicting what data is likely desired by the user when the user travels in the identified segment is that it may significantly reduce the amount of data that needs to be prefetched and cached onto the user's device, which saves time, battery life, memory, and connection bandwidth.

With continued reference to FIG. 2, at step 210, a device of the user is caused to obtain and cache the predicted data.

The scheduling and timing of any portions of the predicted data may be determined based on a number of factors. In some embodiments, the predicted data for different identified segments of the likely future travel path where data network is likely unreliable maybe prefetched prior to the trip or after the trip has begun. For example, data that is not location specific may be prefetched earlier and prior to the trip. In some embodiments, the predicted data maybe prefetched incrementally after the trip has begun. Since the user's actual travel path may change due to traffic congestion and road construction, location specific data may be prefetched incrementally such that the data is not prefetched unnecessarily but is prefetched before connections are down. Location specific data for a particular segment may be incrementally prefetched based on many factors. Some factors include the user's current GPS location, the estimated distance and time before the user reaches the segment, the amount of traffic and speed limit before the user reaches the segment. Some other factors include the network condition, the types of wireless networking technologies available, the connection speed before the user reaches the segment, the amount of data needed to be prefetched, and the like.

Figure 5:
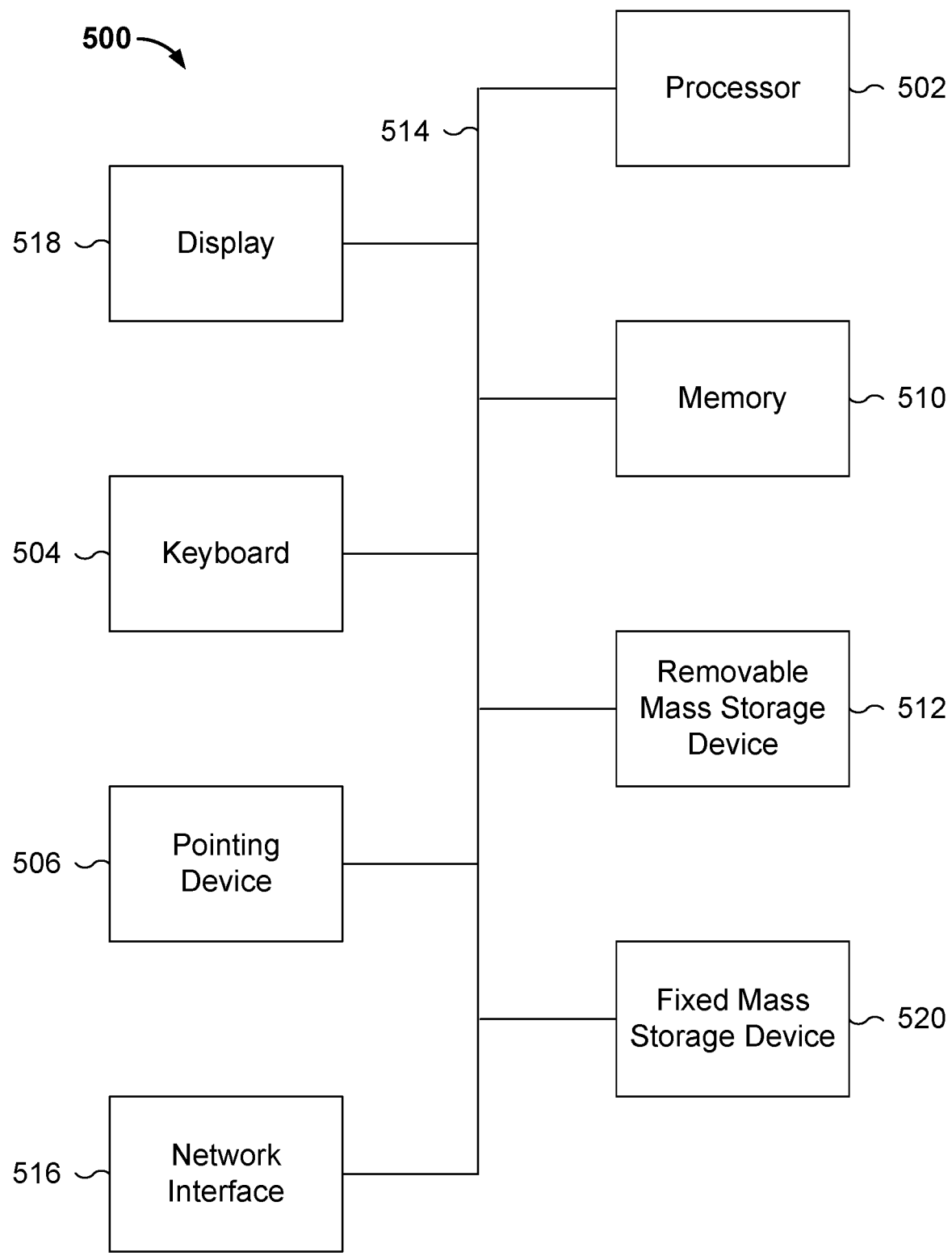
FIG. 5 is a functional diagram illustrating a programmed computer system for executing some of the processes in accordance with some embodiments.

FIG. 5 is a functional diagram illustrating a programmed computer system for executing some of the processes in accordance with some embodiments. As will be apparent, other computer system architectures and configurations can be used as well. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518). In some embodiments, processor 502 includes and/or is used to execute/perform processes 300 and 400 described above with respect to FIGS. 3 and 4.

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage 512, 520 generally store additional programming instructions, data, and the like that typically are not in active use by the processor 502. It will be appreciated that the information retained within mass storage 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining that a user is associated with a travel to a destination location based on the user's online activities and behaviors, and wherein the user's online activities and behaviors comprise the user's online activities and behaviors on social media, including online chats and posts on social media by the user, which indicate that the user is likely planning the travel to the destination location;
   identifying a likely future travel path from a current location of the user to the destination location based at least in part on the user's online search patterns;
   collecting data network availability data from many users on many devices, wherein the many users are connected to a server via the many devices for different online activities, wherein the collected data network availability data comprises metrics that indicate data network coverage and network quality;
   analyzing the collected data network availability data in at least a portion of the likely future travel path;
   based on the analysis of the collected data network availability data, identifying a segment of the likely future travel path where data network is likely unreliable;
   predicting data likely desired by the user when the user travels in the identified segment, wherein the data likely desired by the user is predicted to include facilities and services located at the identified segment based on the user having previously searched for the facilities and services located in the identified segment, according to the user's online search patterns; and
   causing a device of the user to obtain and cache the predicted data.

2. The method of claim 1, wherein the user's online activities and behaviors comprise the user's online reservation or booking that indicates that the user is likely planning the travel to the destination location.

3. The method of claim 1, wherein the determining that the user is associated with the travel to the destination location is based on the user providing a notification or confirmation that he is planning the travel to the destination location.

4. The method of claim 1, wherein the determining that the user is associated with the travel to the destination location is based on the user's GPS (global positioning system) locations that indicate that the user travels to the destination location as a regular routine.

5. The method of claim 1, wherein a metric is associated with a set of attributes, wherein the set of attributes is selected from the group consisting of a location, time, or a type of wireless networking technology.

6. The method of claim 1, further comprising:
   collecting data network availability data from mobile carriers or third-party evaluators.

7. The method of claim 1, further comprising:
   predicting the likely future travel path from the current location of the user to the destination location based on the user's online activities and behaviors on social media, wherein the user's online activities and behaviors on social media comprise online chats and posts on social media by the user.

8. The method of claim 1, further comprising:
periodically updating the likely future travel path from the current location of the user to the destination location.

9. The method of claim 1, further comprising:
predicting a time when the user reaches the segment of the likely future travel path; and
identifying the segment of the likely future travel path where data network is likely unreliable based on a portion of the analysis of the data network availability corresponding to the time.

10. The method of claim 1, further comprising:
predicting the data likely desired by the user when the user travels in the identified segment based on the user's online activities and behaviors on social media, wherein the user's online activities and behaviors on social media comprise online chats and posts on social media by the user.

11. The method of claim 1, further comprising:
causing the device of the user to obtain and cache the predicted data after the travel has begun but before the user arrives at the identified segment, wherein a timing of the obtaining and caching of the predicted data is based on one or more of the following: a GPS location of the user, an estimated distance of the user from the segment, a time period before the user reaches the segment, an amount of traffic from the user to the segment, a driving speed estimate when traveling to the segment, a connection speed when traveling to the segment, and a size of the predicted data.

12. A system for prefetching and caching data onto a device, comprising:
a processor; and
a memory coupled with the processor, wherein the memory is configured to provide the processor with instructions which when executed cause the processor to:
determine that a user is associated with a travel to a destination location based on the user's online activities and behaviors, and wherein the user's online activities and behaviors comprise the user's online activities and behaviors on social media, including online chats and posts on social media by the user, which indicate that the user is likely planning the travel to the destination location;
identify a likely future travel path from a current location of the user to the destination location based at least in part on the user's online search patterns;
collect data network availability data from many users on many devices, wherein the many users are connected to a server via the many devices for different online activities, wherein the collected data network availability data comprises metrics that indicate data network coverage and network quality;
analyze the collected data network availability data in at least a portion of the likely future travel path;
based on the analysis of the collected data network availability data, identify a segment of the likely future travel path where data network is likely unreliable;
predict data likely desired by the user when the user travels in the identified segment, wherein the data likely desired by the user is predicted to include facilities and services located at the identified segment based on the user having previously searched for the facilities and services located in the identified segment, according to the user's online search patterns; and
cause the device of the user to obtain and cache the predicted data.

13. The system recited in claim 12, wherein the memory is configured to provide the processor with instructions which when executed cause the processor to: predict the likely future travel path from the current location of the user to the destination location based on the user's online activities and behaviors on social media, wherein the user's online activities and behaviors on social media comprise online chats and posts on social media by the user.

14. The system recited in claim 12, wherein the memory is configured to provide the processor with instructions which when executed cause the processor to:
predict the data likely desired by the user when the user travels in the identified segment based on the user's online activities and behaviors on social media, wherein the user's online activities and behaviors on social media comprise online chats and posts on social media by the user.

15. The system recited in claim 12, wherein the determining that the user is associated with the travel to the destination location is based on the user's GPS (global positioning system) locations that indicate that the user travels to the destination location as a regular routine.

16. A computer program product for prefetching and caching data onto a device, the computer program product being embodied in a non-transitory tangible computer readable storage medium and comprising computer instructions for:
determining that a user is associated with a travel to a destination location based on the user's online activities and behaviors, and wherein the user's online activities and behaviors comprise the user's online activities and behaviors on social media, including online chats and posts on social media by the user, which indicate that the user is likely planning the travel to the destination location;
identifying a likely future travel path from a current location of the user to the destination location based at least in part on the user's online search patterns;
collecting data network availability data from many users on many devices, wherein the many users are connected to a server via the many devices for different online activities, wherein the collected data network availability data comprises metrics that indicate data network coverage and network quality;
analyzing the collected data network availability data in at least a portion of the likely future travel path;
based on the analysis of the collected data network availability data, identifying a segment of the likely future travel path where data network is likely unreliable;
predicting data likely desired by the user when the user travels in the identified segment wherein the data likely desired by the user is predicted to include facilities and services located at the identified segment based on the user having previously searched for the facilities and services located in the identified segment, according to the user's online search patterns; and
causing the device of the user to obtain and cache the predicted data.

17. The computer program product recited in claim 16, wherein the computer program product comprises computer instructions for: predicting the likely future travel path from the current location of the user to the destination location based on the user's online activities and behaviors on social media, wherein the user's online activities and behaviors on social media comprise online chats and posts on social media by the user.

18. The computer program product recited in claim 16, wherein the computer program product being embodied in the non-transitory tangible computer readable storage medium comprises computer instructions for:
   predicting the data likely desired by the user when the user travels in the identified segment based on the user's online activities and behaviors on social media, wherein the user's online activities and behaviors on social media comprise online chats and posts on social media by the user.

19. The computer program product recited in claim 16, wherein the determining that the user is associated with the travel to the destination location is based on the user's GPS (global positioning system) locations that indicate that the user travels to the destination location as a regular routine.

* * * * *